Figure 1:
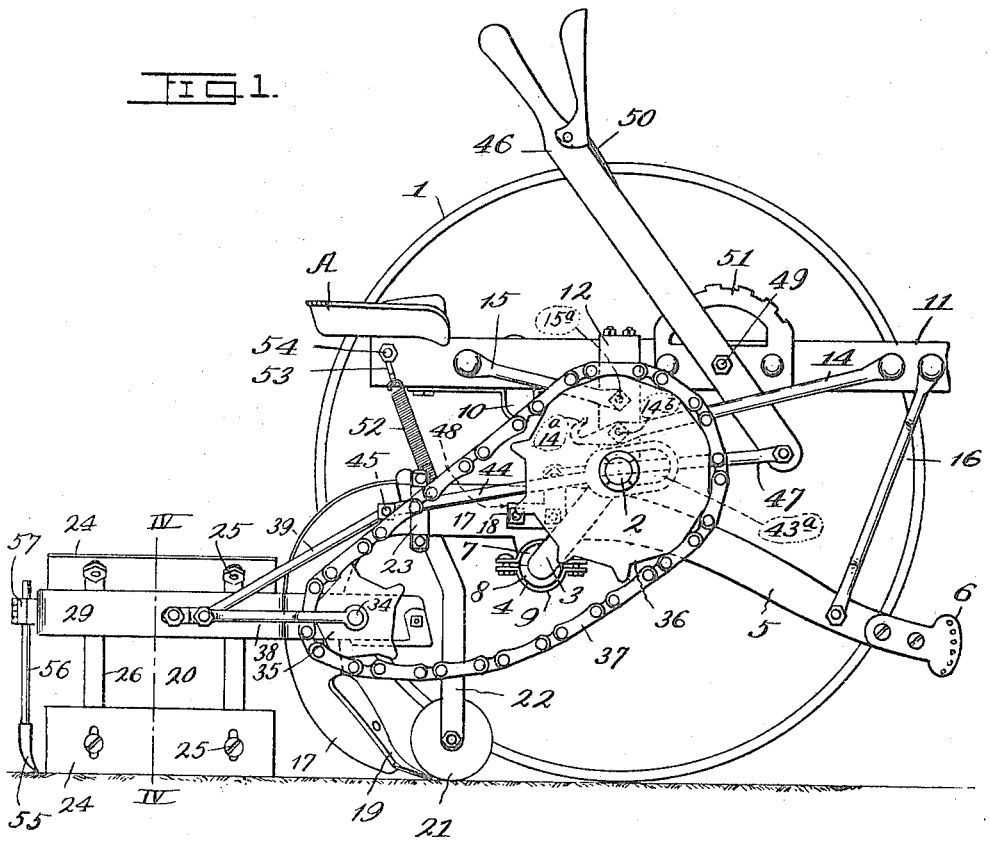

E. T. NOWELL.
COMBINATION FARMING MACHINE.
APPLICATION FILED JAN. 3, 1916.

1,207,984.

Patented Dec. 12, 1916.
2 SHEETS—SHEET 1.

WITNESSES:
Fred C. Fischer
L. J. Fischer

INVENTOR:
Edward T. Nowell,
BY
F. J. Fischer
ATTORNEY.

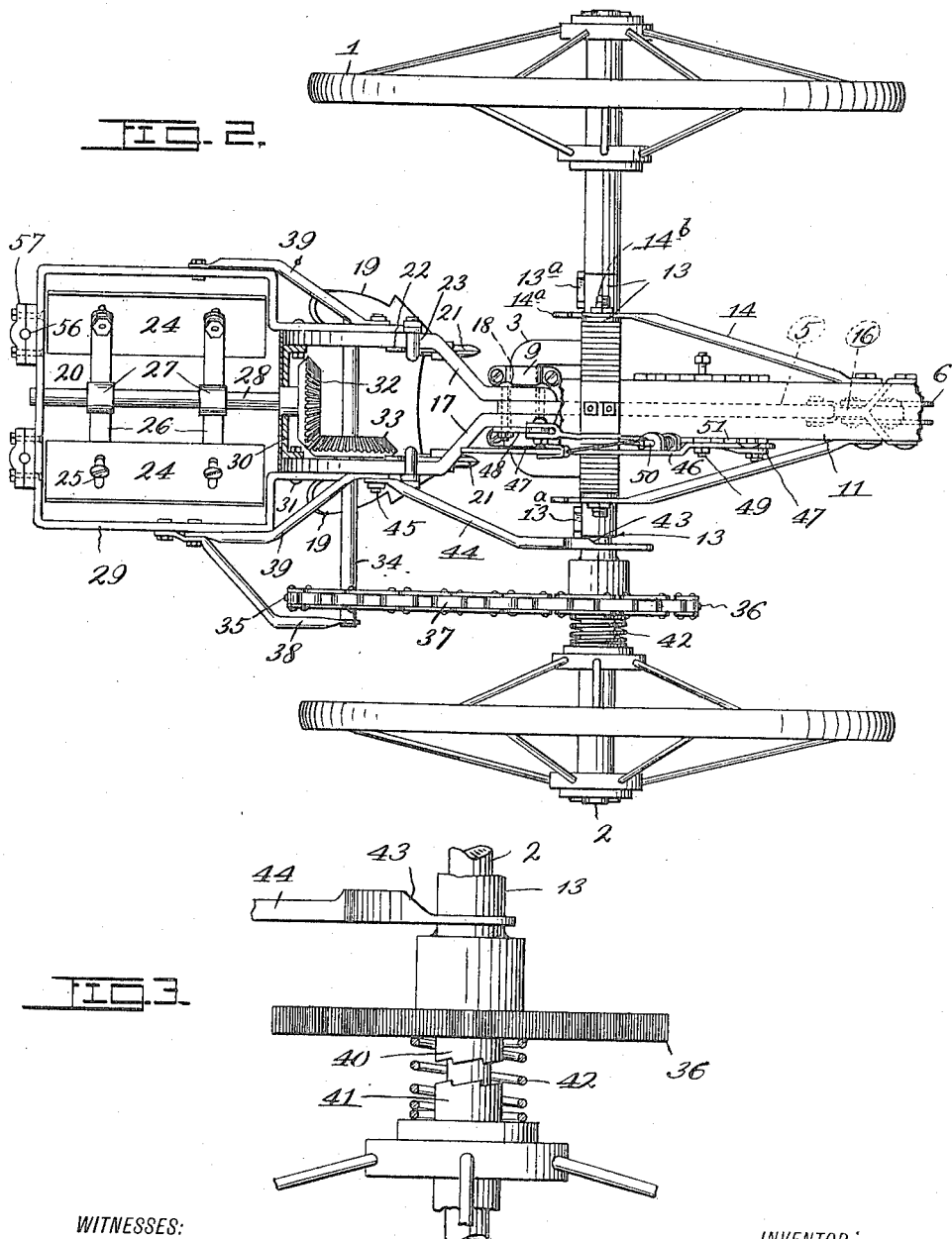

UNITED STATES PATENT OFFICE.

EDWARD T. NOWELL, OF STOTTS CITY, MISSOURI.

COMBINATION FARMING-MACHINE.

1,207,984. Specification of Letters Patent. Patented Dec. 12, 1916.

Application filed January 3, 1916. Serial No. 69,711.

*To all whom it may concern:*

Be it known that I, EDWARD T. NOWELL, a citizen of the United States, residing at Stotts City, in the county of Lawrence and State of Missouri, have invented certain new and useful Improvements in Combination Farming-Machines, of which the following is a specification.

My invention relates to farming machines and consists in the organization of parts shown in the drawings and particularly pointed out in the claims.

While susceptible of other uses, the machine is particularly adapted to the cultivation of cotton, and in order that the invention may be fully understood, reference will now be made to the accompanying drawing, in which:—

Figure 4:
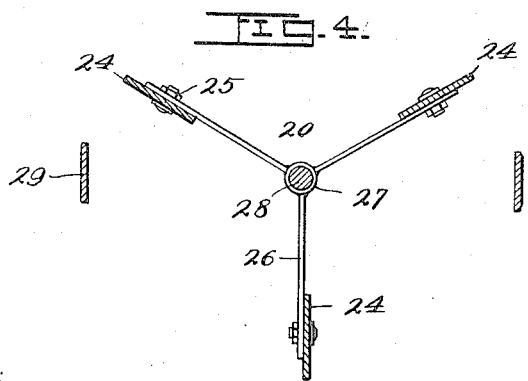

Figure 1 is a side elevation of the machine with one of the carrying wheels removed and arranged as a combination cotton chopper and cultivator. Fig. 2 is a plan view of the same with some of the parts removed. Fig. 3 is a broken plan view of a clutch and adjacent parts employed in carrying out the invention. Fig. 4 is a cross section of the cotton chopper, enlarged, on line IV—IV of Fig. 1.

Referring now in detail to the various parts, 1 designates a pair of ground or carrying wheels rotatably mounted upon the ends of an axle 2, having a centrally-disposed arched portion 3, which extends through a bearing 4 supporting a long beam 5, provided at its forward end with a clevis 6 to which a team or tractor may be hitched. The upper half 7 of the bearing 4 is, preferably, formed integral with the beam 5, while the lower half 8 is removably secured to said upper half by clips 9, so that the arch 3 can be removed from said bearing and swung upward into a loop 10 when desired. The loop 10 is secured to the underside of a tongue 11, supported by a yoke 12, secured at its ends to the upturned lugs on a pair of sleeves 13, mounted upon the axle 2 at opposite sides of its arched portion 3, and provided with stirrups 13$^a$, for the driver to rest his feet upon. The tongue 11 is further secured to the yoke 12 by forwardly and rearwardly extending braces 14 and 15, respectively, and the forward portion of the beam 5 is connected to the tongue 11 by a forked rod 16. The braces 14 are secured to the yoke 12 with bolts 14$^b$, and the braces 15 are secured to said yoke 12, by bolts 15$^a$.

The rear portion of the beam 5 is provided with a pair of short plow beams 17 removably secured at their upper forward ends to the beam 5 with bolts 18, while the lower ends of said plow beams 17 are provided with small plows 19 for forming two parallel furrows between which the cotton chopper 20 cleans out the superfluous plants. The soil is cut in advance of the plow points by a pair of colters 21 journaled at the lower ends of arms 22 secured at their upper ends to the sides of the plow beams 17 by clips 23.

The cotton chopper 20 consists of a plurality of blades 24 having bolt and slot connections 25 with arms 26, so that wear may be taken up and they may be adjusted into proper relation with the soil. The arms 26 radiate from hubs 27, fixed upon a shaft 28, journaled at its rear end in a frame 29 and at its forward end in a cross bar 30 secured to the rear portion of the plow beams 17. The frame 29 extends around the rear and sides of the cotton chopper 20 and is secured at its forward ends to the plow beams 17 by bolts 31.

The shaft 28 is provided at its forward end with a fixedly-mounted bevel gear 32, driven by a bevel gear 33, fixed upon a shaft 34, provided with a small fixed sprocket wheel 35, driven by a large sprocket wheel 36 through the intermediacy of an endless sprocket chain 37. The shaft 34 is journaled in the forward ends of the frame 29 and a brace 38 secured at its rear end to said frame 29, which, in addition to being secured to the short plow beams 17 by the bolts 31, is further secured to said plow beams by braces 39.

The large sprocket wheel 36 is loosely mounted upon the axle 2 and has a clutch member 40, for engagement with a companion clutch member 41, fixed to the hub of the adjacent carrying wheel 1. A coiled spring 42, interposed between the sprocket wheel 36 and the hub of the adjacent carrying wheel 1, tends to hold the clutch member 40 out of engagement with the companion clutch member 41, as disclosed by Fig. 3. The clutch member 40 is automatically shifted into engagement with the clutch member 41 by a wedge 43 on the forward end of an automatic shifter bar 44, secured at its rear end to a bolt 45 extending through the forward end of one of the braces 39. The forward end of the wedge 43 is interposed between the hub of the sprocket wheel 36 and the adjacent sleeve 13, and has a slot 43ª, through which the axle 2 extends.

When the plow beams 17 are in lowered position as disclosed by Fig. 1, the shifter bar 44 is in advanced position with the thick portion of its wedge 43 between the sleeve 13 and the hub of the sprocket wheel 36, and thus holds the clutch member 40 in engagement with the clutch member 41, but when said plow beams 17 are raised they swing backward and upward and draw the thick portion of the wedge 43 from between the sleeve 13 and the hub of the sprocket wheel 36, and thus allow the spring 42 to shift the clutch member 40 out of engagement with the companion clutch member 41.

The lifting of the plow beams 17, together with the long beam 5 to which it is bolted, as hereinbefore described, is accomplished by a hand lever 46 and a connecting rod 47, which latter is pivoted at its forward end to the former and pivoted at its rear end to a lug 48 secured to the bolts 18. The lever 46 can be conveniently reached from a seat A, on the tongue 11, and is fulcrumed upon a pivot 49, and provided with a latch 50 for engagement with a notched sector 51, secured to the adjacent side of the tongue 11. The lifting of the beams 5 and 17 is aided by a pair of coiled springs 52, secured at their lower ends to the beams 17 and at their upper ends to hooks 53, secured at opposite sides of the rear portion of the tongue 11 by a bolt 54.

55 designates a pair of small cultivator shovels arranged in the rear of the cotton chopper 20 to throw the soil toward the "stands" of young plants. Said shovels 55 are secured to upwardly-extending rods 56, secured at their upper portions in clamps 57, fastened to the rear portion of the frame 29 at opposite sides of the shaft 28.

When the cultivating appliances are adjusted to their respective working positions, disclosed by Fig. 1, the colters 21 cut the soil in advance of the plows 19, which plow two shallow furrows on opposite sides of a row of young plants being thinned out. The plants are then subjected to the action of the revolving chopper 20, the blades of which chop out the superfluous plants, leaving "stands" of the desired dimensions, which may be regulated by using chopping blades of different lengths, it being understood that by reducing the length of said blades the dimensions of the "stands" will be increased, and vice versa.

While I have shown and described the preferred form of my invention, I reserve the right to make such changes in the construction, combination and operation of parts as properly fall within the spirit and scope of the appended claims.

Having thus described my invention, what I claim and desire to secure by Letters Patent, is:

1. In a machine of the character described, a pair of carrying wheels one of which has a clutch member, an axle upon which said wheels are rotatably mounted, a gear wheel loosely-mounted upon the axle and provided with a clutch member adapted to be driven by the clutch member on the carrying wheel, gearing driven by said gear wheel, cultivator appliances driven by said gearing, manual means for raising and lowering said cultivator appliances, and a shifter bar controlled by the cultivator appliances and provided with a wedge adapted to engage and shift the gear clutch into engagement with the wheel clutch when said cultivator appliances are lowered.

2. In a machine of the character described, a pair of carrying wheels one of which has a clutch member, an axle upon which said wheels are rotatably mounted, sleeves through which said axle extends, a yoke secured to said sleeves, a tongue secured to said yoke, a gear wheel loosely mounted on the axle adjacent one of the sleeves and provided with a clutch member adapted to be driven by the clutch member on the carrying wheel, rotary cultivator appliances geared to said gear wheel, means for raising and lowering said cultivator appliances, and a shifter bar having a slotted portion through which the axle extends and a wedge portion interposed between the gear wheel and one of the sleeves to shift the gear wheel clutch member into engagement with the carrying wheel member clutch when the cultivator appliances are lowered.

3. In a machine of the character described, a tongue, an axle to support said tongue, carrying wheels rotatably mounted upon said axle and one of which has a clutch member, a plow operably-connected to the axle and the tongue, a frame extending rearwardly from said plow, a rotary cotton chopper journaled in said frame, gearing for driving said cotton chopper, a gear wheel loosely-mounted on the axle to drive said gearing, and provided with a clutch member for engagement with the clutch member on the carrying wheel, manual means for raising and lowering the plow and the cotton chopper, springs secured to the tongue and the plow to assist in raising the latter, and a shifter bar connected to said plow and adapted to shift the gear wheel clutch member into engagement with the carrying wheel clutch member when the plow is lowered.

In testimony whereof I affix my signature, in the presence of two witnesses.

EDWARD T. NOWELL.

Witnesses:
F. G. FISCHER,
L. J. FISCHER.

Copies of this patent may be obtained for five cents each, by addressing the "Commissioner of Patents, Washington, D. C."